United States Patent Office 3,207,812
Patented Sept. 21, 1965

3,207,812
PROCESS FOR COPOLYMERISING OLEFINS
James Keith Hambling and Geoffrey Winton Alderson, Sunbury-on-Thames, England, assignors to The British Petroleum Company Limited, London, England, a British joint-stock corporation
No Drawing. Filed Mar. 5, 1962, Ser. No. 177,225
Claims priority, application Great Britain, Mar. 7, 1961, 8,246/61
6 Claims. (Cl. 260—683.15)

This invention relates to a process for the production of hexenes.

It is an object of the present invention to provide an improved process for the copolymerisation of ethylene and a butene. It is a further object of the invention to provide an improved process for the preparation of isoprene. Other objects will appear hereinafter.

According to this invention there is provided a process for the production of hexenes which comprises passing ethylene and a butene in contact with a catalyst consisting of or containing an elemental alkali metal having an atomic number less than 19 dispersed on an anhydrous potassium compound.

In general, these catalysts are not active unless treated at elevated temperature, being preferably a temperature in excess of the melting point of the elemental alkali metal dispersed. This treatment may be incorporated in the method of obtaining the dispersions referred to above, or may be carried out subsequently.

Suitable potassium compounds are potassium hydroxide and potassium salts of mineral acids. Suitable potassium salts of mineral acids are silicate, sulphate and halides; the preferred salt is potassium carbonate.

Of the alkali metals commercially available, sodium is the most readily obtained and it is the preferred metal for deposition on the support material. If desired, however, lithium may be employed.

Preferably the elemental alkali metal deposited on the potassium compound is sodium or lithium, or both of these metals.

The catalyst used in the process of this invention may be prepared by mixing a molten elemental alkali metal as hereinbefore described with a potassium compound as hereinbefore described.

Preferably the molten sodium or lithium is stirred vigorously with the potassium compound in a finely divided form. Suitably the potassium compound will have a particle size less than 100 mesh B.S.S. Usually it is desirable to provide a blanket of an inert gas, e.g. nitrogen, whilst mixing is carried out.

The temperature at which the alkali metal is deposited on the potassium compound is not critical. Generally at temperatures nearer the melting point of the alkali metal, vigorous stirring is necessary for a longer period of time than when the elemental metal is applied at higher temperatures. The temperature will in general be chosen also having regard to any tendency of the potassium compound to decompose, melt or sinter. Preferably, conditions and potassium compond are chosen such that these phenomenon do not occur.

In general, sodium metal will be deposited on the potassium compound at a temperature of at least 250° C., preferably 250–500° C., the potassium compound being selected accordingly, and lithium metal will in general be deposited at a temperature not exceeding 225° C.

The amount of elemental metal employed is generally between 1 and 20% by weight of the potassium compound, preferably between 2 and 7% and more preferably between 4 and 6% by weight.

It is believed that under the conditions of catalyst preparation described hereinbefore metallic potassium is liberated in a highly dispersed state in the presence of sodium metal whereby a catalyst of greater polymerising activity is obtained than can be formed by the direct dispersion of potassium metal on to a support.

Any one of the butene isomers may be used with ethylene in the process of the invention or, if desired, there may be used a mixture of two or three isomers. Furthermore, there may be used, with ethylene, a hydrocarbon fraction consisting of or containing one or more butenes; thus there may be used a butene-containing refinery $C_4$ stream.

The main $C_6$ products obtained by the use of the butene isomers are as follows:

Feedstock: Product
    Ethylene and normal butene-1 __ 3-methylpentene-1.
    Ethylene and normal butene-2 __ Normal hexenes.
    Ethylene and isobutene _____ 2-methylpentene-2.

The process of this invention is particularly suitable for the production of isoprene-pre-cursors, that is hydrocarbons which can be demethanised, for example by pyrolysis to form isoprene. Thus by selection of reaction temperature and pressure, there may be obtained high yields of 2-methylpentene-2. Also by selection of reaction temperature and pressure high yields of 2-methylpentene-1 may be obtained. This may be isomerised to yield an isoprene pre-cursor.

Usually temperatures in the range 100 to 200° C. for example 170° C., will be employed for effecting the copolymerisation of the ethylene and butene.

Usually the reaction pressure will be atmospheric or superatmospheric, preferably up to 4000 lbs./sq. in. gauge. Suitably the partial pressure of ethylene will be about 1000 lbs./sq. in. gauge and the total partial pressure of butenes will be about 900 lbs./sq. in. gauge.

Suitably the range of ratios of partial pressure of ethylene to total butenes will lie from 1:2 to 5:1, preferably about 1:1.

The process may be carried out either in the presence or absence of a solvent. Preferred solvents are hydrocarbons, for example normally liquid paraffins; normal heptane is a particularly suitable solvent.

Preferably the feedstock will be free of dienes and acetylenes or will contain at most only a low total percentage content of these materials. Preferably the total content of dienes and acetylenes will be less than 1.0% by weight of the olefinic feedstock.

The preferred catalyst for effecting the copolymerisation of ethylene and isobutene to form methyl pentenes is sodium deposited on potassium carbonate.

According to a further aspect of this invention there is provided a process for the production of isoprene which comprises co-polymerising (a) ethylene and (b) normal butene-1 and/or isobutene, in contact with a catalyst, as hereinbefore described, consisting of or comprising an elemental alkali metal, on a potassium compound, recovering from the product a $C_6$ fraction consisting of or containing one or more methylpentenes, and demethanising this fraction, or a $C_6$ fraction derived therefrom which contains at least one methylpentene capable of demethanisation to isoprene, whereby isoprene is formed.

The invention is illustrated but not limited with reference to the following examples.

EXAMPLE 1

4 grams of sodium metal was mechanically mixed with 100 ccs. of anhydrous potassium carbonate of less than 100 B.S.S. mesh at 360° C. The catalyst was charged to a 1 litre stainless steel rocking autoclave and the system heated to 170° C. Isobutene was fed in at a pressure of 900 lbs./sq. in. gauge, and, thereafter, ethylene to a total pressure of 1500 lbs./sq. in. gauge. The reaction was allowed to continue for 20 hours at the temperature of 170° C., pressures falling during this period to 500 lbs./sq. in. gauge.

The products and condensible gases were collected in acetone/solid $CO_2$ cooled traps. The contents were allowed to warm to ambient temperature to remove volatiles up to and including $C_4$ hydrocarbons. The residue was distilled in a 5 theoretical plate column to recover a 32–66° C. fraction which was analysed by gas chromatography. This fraction was 70% by wt. of the total normally liquid reaction products.

This product contained:

| | Percent by wt. |
|---|---|
| 2-methylpentene-1 | 52 |
| 2-methylpentene-2 | 48 |

EXAMPLE 2

A 5% dispersion of Na on $K_2CO_3$ was prepared at 370° C. Using this catalyst, ethylene (450 p.s.i.g.) was reacted at 170° C. with Refinery $C_4$ gas (1300 p.s.i.g.) in a 1L strainless steel autoclave.

*Analysis of $C_4$ stream*

| | Percent wt. |
|---|---|
| Isobutene | 33 |
| Butene-1 | 15 |
| Butene-2 | 10 |
| Butane | 40 |

The hexene product was distilled from the autoclave and analysis by gas liquid chromatography and infra-red absorption showed it to contain:

| | Percent wt. |
|---|---|
| 3-methylpentene-1 | 22.1 |
| 3-methylpentene-2 | 7.4 |
| 2-methylpentene-1 | 43.3 |
| 2-methylpentene-2 | 14.4 |
| 4-methylpentene-2 | 0.8 |
| n-Hexenes | 12.0 |

We claim:
1. A process for the production of hexenes, comprising: contacting a mixture consisting essentially of ethylene and a butene with a catalyst prepared by dispersing sodium metal on potassium carbonate.

2. A process according to claim 1, in which, the catalyst is prepared by dispersing 1 to 20% by weight of sodium on the potassium carbonate.

3. A process according to claim 1, comprising: contacting a mixture consisting essentially of ethylene and butene-1 with said catalyst and recovering a fraction comprising 3-methylpentene-1 from the reaction products.

4. A process according to claim 1, comprising: contacting a mixture consisting essentially of ethylene and butene-2 with said catalyst and recovering a normal hexene fraction from the reaction product.

5. A process according to claim 1, comprising: contacting a mixture consisting essentially of ethylene and isobutene with said catalyst and recovering 2-methylpentene-1 and 2-methylpentene-2 from the reaction product.

6. A process for the production of hexenes, comprising: contacting a mixture consisting essentially of ethylene and a butene with a catalyst consisting essentially of sodium metal dispersed on anhydrous potassium carbonate.

References Cited by the Examiner

UNITED STATES PATENTS

| 2,466,694 | 4/49 | Freed | 260—683.15 |
| 2,492,693 | 12/49 | Freed | 260—683.15 |
| 2,986,588 | 5/61 | Schramm | 260—683.15 |
| 3,028,441 | 4/62 | Bush et al. | 260—683.15 |
| 3,087,978 | 4/63 | Wilson et al. | 260—683.15 |
| 3,095,461 | 6/63 | Wilkes | 260—683.15 |
| 3,104,271 | 9/63 | Lindsay | 260—683.15 |

FOREIGN PATENTS 832,475   4/60   Great Britain.

OTHER REFERENCES

Ladoo et al.: "Nonmetallic Minerals" pub. by McGraw-Hill Book Co., Inc., New York (1951) (pages 185 and 408 relied on).

PAUL M. COUGHLAN, *Primary Examiner.*

ALPHONSO D. SULLIVAN, *Examiner.*